Nov. 18, 1941.   J. SEIB   2,263,279
JOINT FOR THE CONNECTION OF SHAFTS
Filed Dec. 29, 1938   2 Sheets-Sheet 1
Fig. 1
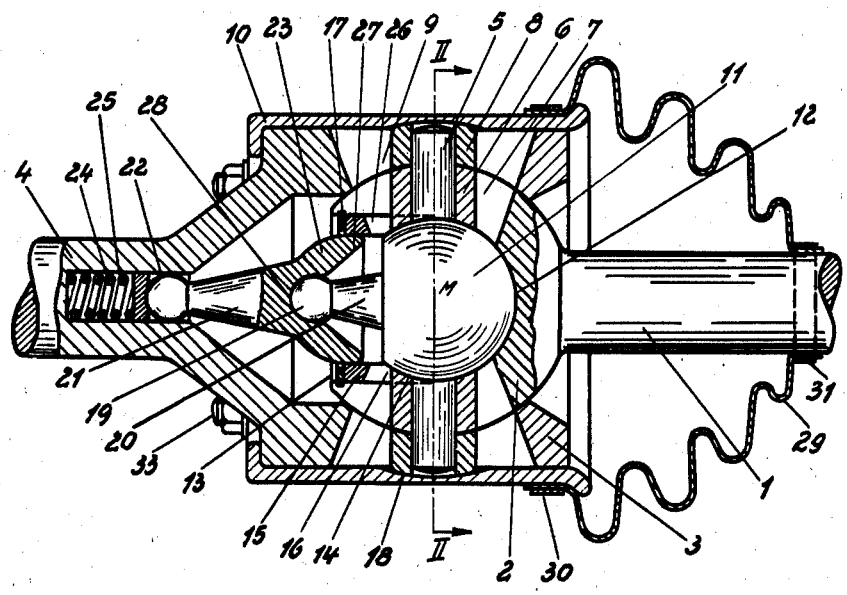
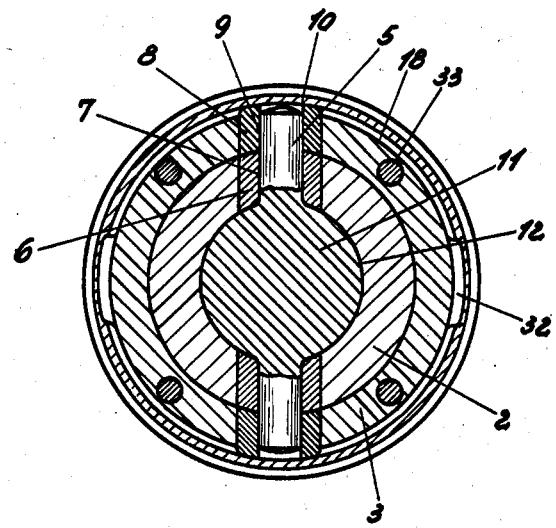
Fig. 2
Inventor:
JAKOB SEIB
BY Haseltine, Lake & Co.
Attorneys Nov. 18, 1941.   J. SEIB   2,263,279
JOINT FOR THE CONNECTION OF SHAFTS
Filed Dec. 29, 1938   2 Sheets-Sheet 2

Inventor:
JAKOB SEIB
BY Haseltine Lake & Co.
Attorneys

Patented Nov. 18, 1941

2,263,279

UNITED STATES PATENT OFFICE 2,263,279

JOINT FOR THE CONNECTION OF SHAFTS

Jakob Seib, Suhl, Germany, assignor to the firm Berlin-Suhler Waffen-und Fahrzeugwerke G. m. b. H., Weimar, Germany Application December 29, 1938, Serial No. 248,242 In Germany January 5, 1938

4 Claims. (Cl. 64—21)

This invention relates to joints forming an articulated connection between two rotating shafts or shaft parts which are at the same time required to swivel with respect to one another, for example, in vehicles, more especially automotive vehicles, machinery, measuring apparatus, etc., and is concerned more particularly with an articulated shaft coupling of the kind in which a spherical head on one shaft is coupled to a spherical ball socket on the other shaft by means of a driver passing through said head and socket transversely of the axes of the shafts, said driver being mounted in slots in said head and ball socket and when in operation being actuated by means of a controlling member engaging with both shafts so that its axis always coincides with the symmetrical plane bisecting the angle enclosed by the shafts.

In a known joint of this kind the driver is formed with a central rectangular reinforcement which is held in a rectangular opening in a member controlling and moving the driver and is adapted to slide longitudinally and transversely in said opening, the controlling member being provided with pivots, one on each side of the driver, which are located perpendicularly to the axis of the driver and form the means by which the driver is coupled with the two shafts, ball bearings being interposed therebetween.

Due to the fact that in this known construction the controlling member must be slidable upon the rectangular central portion of the driver both in the direction of the longitudinal axis of the driver as well as transversely thereof, the spherical, concave surface of a housing enclosing the head and socket has been utilized for the purpose of holding the driver, which is formed with spherical end surfaces, in a central position, that is to say, in such position that its axis always passes through the centre of the entire system. However, this construction does not allow of obtaining sufficient centering in shaft couplings intended to transmit high torque and where large angles of displacement occur between the coupled shafts, for the reason that the thickness of the driver is restricted and its spherical end surfaces therefore bear against the inner surface of the outer housing only over a limited area. In view of this circumstance and also on account of the unavoidable limitations in the dimensions of the several parts and the sliding engagement between the central, rectangular portion of the driver and the controlling member, the driver may in operation easily become wedged in the outer housing owing to the high pressure forces which occur, and this renders the joint ineffective.

It is the object of the invention to provide a universal joint or an articulated shaft coupling of the kind hereinbefore referred to which ensures safe working without seizure under very great transmission forces and large displacement angles between the shafts.

According to the invention the central portion of the driver is of spherical form and is rotatable in all directions within a concave socket-shaped bearing in the interior of the head, being so held that its centre coincides with the centre of the entire system. By reason of this arrangement it is also possible to arrange for one or more additional drivers to be carried by the spherical central portion of the driver, said drivers being also held with their centres coinciding with the centre of the entire system; but being capable of slight movement in the plane of symmetry of the shafts both with respect to the driver by which they are carried as well as with respect to one another.

Some constructional embodiments of the invention are illustrated in the drawings by way of example. In said drawings, Figure 1 is a longitudinal section through one construction of the universal joint or coupling according to the invention having a driver passing through said coupling from one side to the other. The drawing shows the parts in the position which they occupy when the two coupled shafts are coaxial.

Figure 2 is a cross section on the line II—II of Figure 1.

Figure 3:
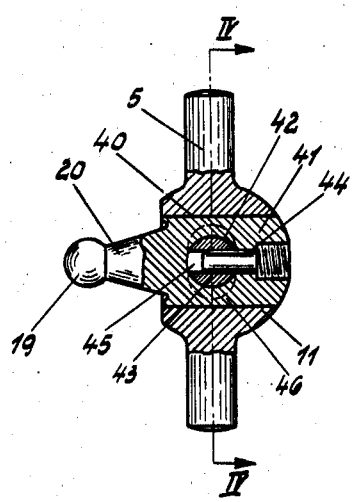
Figure 3 is a view, partly in section, of the driver unit of a constructional form of coupling having two drivers.

In the embodiment illustrated in Figures 1 and 2 the spherical head 2 is carried by a shaft 1 and is encased within a ball socket 3 carried by a shaft 4. The transmission from one shaft to the other is effected by means of a driver 5 passing through the ball socket and the head and carrying at both ends cylindrical rollers 6 and 8 of which the inner rollers 6 are in rolling contact with the side wall of slots 7, in the head 2, and the outer rollers 8 are in rolling contact with the side walls of slots 9 in the ball socket 3, the rollers 8 when in operation moving in a direction opposite to that of the rollers 6. As shown in the drawings the slots 7 are open at one end and closed at the other while the slots 9 are closed at both ends. The slots are covered by an exterior housing ring 10 encasing the ball socket 3. Instead of cylindrical rollers use may also be made of spherical or conical rollers and in the latter case the faces of the slots in the head and socket are also made conical.

The central portion 11 of the driver 5 is in the form of a sphere enclosed in a ball-shaped socket bearing and adapted to rotate in all directions, the centre of said sphere coinciding with the centre M of the entire system, so that the spherical centre portion 11 of the driver 5 is constantly held with its centre coinciding with the centre M. The ball-shaped socket bearing for the spherical portion 11 of the driver 5 is formed on that side to the right of the section line II—II (as seen in Figure 1) by a spherical surface 12 at the end of a cylindrical recess 13 in the spherical head 2, and on that side to the left of the section line II—II by a spherical surface 14 in the inside of a thrust bearing ring 15. The ring 15, which is formed with slots 16 corresponding to the slots in the spherical head 2, is fitted into the cylindrical recess 13 in the head 2, where it is held in position by means of a spring ring 17 or other means engaging with said head.

The rollers 6 and 8, which are rotatably arranged on the driver 5, are secured against movement in the outward direction owing to the fact that the outer rollers 8 are guided along the housing ring 10 in a peripheral spherically arched groove 18. The end surfaces of the driver on the contrary have no contact with the outer housing ring 10.

The central portion 11 of the driver 5 is formed with an extension 20 provided with a spherical end 19, by means of which the driver is positively so actuated in operation by means of a controlling member that the axis of the driver fulfils the condition of being always held in the symmetrical plane bisecting the angle of displacement between the two shafts. The controlling member comprises a rod 21 located on one side of the axis of the driver and provided with spherical ends 22 and 23.

The controlling rod 21 is rotatably and slidably mounted with its smaller spherical end 22 in a cylindrical axial bore 23 in the socket 3 or of the shaft 4 respectively, and is forced in the direction of the centre M of the system by means of a spring 25 within said bore. The larger spherical end 23 of the controlling rod 21 is rotatably and slidably mounted in a cylindrical bore 26 formed by the inner surface of the thrust bearing ring 15 and this end of the rod is hollowed to provide a coned or flared recess 27 having at its inner end a spherical bearing surface for the spherical end 19 of the driver extension 20. In operation, the control rod 21 is held constantly in engagement with the spherical end 19 of the extension 20 by means of the spring 25, so that said end 19 remains seated in its bearing.

The open side of the joint or coupling is covered by means of a cap 29 of leather or the like, which is firmly attached to the housing 10 by means of a clamp ring 30 and to the shaft 1 by a clamp ring 31. In this manner the entire interior of the coupling, which is filled with lubricant, is made dustproof and liquid-tight. The lubricant may be conveyed to the coupling and replenished for example through one of the shafts but for sake of clearness the bores and passages provided in the individual parts for the lubricant circulation have been omitted from the drawing.

In order that during assembly of the parts of the joint the housing ring 10 may be fitted over the portions of the driver projecting from the ball socket, two longitudinal grooves 32 (Fig. 2) are formed in the inner face of said ring 10, the said grooves extending from the open end and being arranged diametrically opposite to one another. The said grooves terminate at their other ends in the peripheral groove 18. The housing ring 10 is fitted in the manner of a bayonet attachment, being pushed axially over the ball socket 3 from the direction of the shaft 4, the projecting portions of the driver being guided in the grooves 32. When the projecting portions of the driver reach the plane of the spherically arched groove 18 the housing ring is turned through 90° and said portions enter the groove. In order that the socket 3 may be brought over the spherical head 2 it is composed of two portions which fit together by means of recessed edges in the plane represented by the line II—II, which are held together by means of studs 33 or the like. Said studs 33 may at the same time serve the purpose of attaching the inner or closed end of the housing ring 10 to the socket 3.

Figure 4:
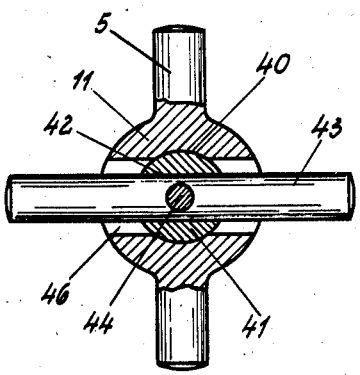
Figure 4 is a cross section on the line IV—IV of Figure 3.

In Figures 3 and 4 a driver unit having two drivers is for the sake of simplicity illustrated separately from the joint or coupling as the remaining parts of said coupling correspond with those of the coupling illustrated in Figures 1 and 2 except that the head 2, the socket 4 and the bearing 15 have additional slots for the second driver and the housing ring 10 is provided with another pair of grooves 32.

The central portion 11 of the driver, which is of spherical form, is in this example provided with a cylindrical bore 40 extending transversely of the axis of the driver 5, a cylindrical member 41 being rotatably mounted in said bore. This member 41 is formed with an opening 42 through which the second driver 43 passes. The driver 43 may be pressed into the member 41 or, as is the case in the present constructional form, it may be secured against longitudinal and rotary movement in said member 41 by means of a separate fixing device, which consists of a stud 44 threaded into the member 41, said stud engaging in a hole 45 extending transversely of the axis of the driver 43.

In order that the second driver 43 may carry out the necessary relative movement with respect to the driver 5 on which it is carried there is provided in the central spherical portion 11 of the driver 5 a passage 46 of such dimensions that the driver 43 has a certain freedom of movement relative to the driver 5 in the plane of symmetry of the shafts.

The extension 20 engaging with the control rod 21, may, in this construction, be attached to the member 41 carrying the driver 43 formed integrally therewith as illustrated in Figure 3 instead of to the spherical central portion 11 of the driver 5.

Figure 5:
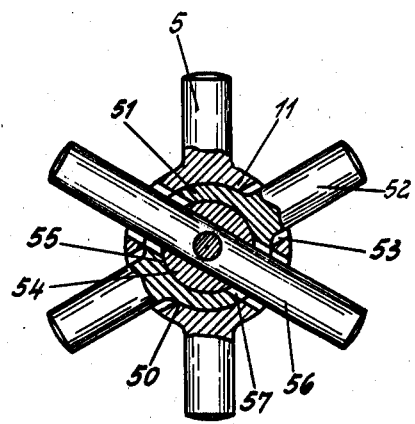
Figure 5 is a similar view to the view of Figure 4 of a driver unit of a constructional form of coupling having three drivers.

The driver unit illustrated in Figure 5 is intended for a shaft coupling operating with three drivers, for which purpose the spherical head 2 and the ball socket 3 are provided with three pairs of diametrically opposite slots arranged at 60 degrees with respect to one another.

In this construction the spherical central portion 11 of the driver 5 is provided with a cylindrical bore 50 extending transversely of its axis within which the cylindrical central portion 51 of a second driver 52 is rotatably mounted. The ends of said latter driver, which by means of rollers engage within slots in the head and socket, pass through diametrically arranged openings 53 displaced at 60 degrees with respect to the axis of the driver 5, said openings being of such dimensions that the driver has a certain freedom of movement relative to the driver 5 in the plane of symmetry of the shafts.

The cylindrical central portion 51 of the driver 52 is in turn provided with a cylindrical bore 54 co-axial with the bore 50 of the driver 5 and accommodating a cylindrical member 55 in which a third driver 56 is firmly attached, for example, in the same manner as in Figures 3 and 4. The driver 56 passes through openings 57 in the cylindrical central portion 51 of the driver 52 and also through openings 53a in the spherical central portion 11 of the driver 5, said openings being of such dimensions that the driver 56 has a certain freedom of movement relative to the drivers 52 and 5 in the plane of symmetry of the shafts. The entire unit is rotatably mounted with the spherical central portion 11 of the driver 5 in the ball-shaped socket bearing 12, 14 of the head 2, so that the centres of all the drivers are constantly held so as to coincide with the centre of the entire system when in operation.

What I claim is:

1. In a universal joint for the connection of two shafts the combination of a spherical head on one shaft and a bowl-shaped ball socket member on the other shaft, the said head being provided in its interior with a ball-shaped socket bearing, the head and the ball socket member being provided with slots, a controlling member having spherical ends of different sizes, an exterior housing ring adapted to encase the said ball socket member, a thrust bearing ring inserted in the spherical head, a driving member passing through the slots in the head and the ball socket member, the central portion of the said driving member being of spherical form and provided with an extension having a spherical end and adapted to cooperate with the controlling member, the smaller spherical end of the controlling member being slidably and rotatably mounted in an axial cylindrical opening in the socket member and the larger spherical end being slidably and rotatably mounted in said thrust bearing ring.

2. In a universal joint for the connection of two shafts the combination of a spherical head on one shaft and a bowl-shaped ball socket member on the other shaft, the said head being provided in its interior with a ball-shaped socket bearing, the head and the ball socket member being provided with slots, a driving member passing through the slots in the head and the ball socket member, the central portion of the said driving member being of spherical form, one driver passing said central portion and being held with its center coinciding with the center of the entire system, the spherical central portion of said one driver being provided with a cylindrical bore transversely of the axis thereof and having a cylindrical member rotatably mounted in said cylindrical bore, the other driver being secured within said cylindrical member and said second driver passing freely through an opening in the spherical central portion of the first driver, said drivers being arranged perpendicularly to one another in the aligned position of the two shafts and said drivers during operation of the system being free to carry out slight movements in the plane of symmetry of the shafts relatively to the driving member carrying them and to one another.

3. In a universal joint for the connection of two shafts the combination of a spherical head on one shaft and a bowl-shaped ball socket member on the other shaft, the said head being provided in its interior with a ball-shaped socket bearing, the head and the ball socket member being provided with slots, a driving member passing through the slots in the head and the ball socket member, the central portion of the said driving member being of spherical form and provided with at least one additional driver held with its center coinciding with the center of the entire system, the drivers in the operation of the system being free to carry out slight movements in the plane of symmetry of the shafts relatively to the driving member carrying them and to one another, the spherical central portion of one driver being provided with a cylindrical bore transversely of the axis of said driver, a cylindrically shaped central portion of the second driver being rotatably mounted in said cylindrical bore, said one driver being provided in said cylindrical central portion with a cylindrical bore within which a cylindrical member is rotatably mounted, the third driver being secured in the said cylindrical member, the second driver passing freely through openings in the spherical central portion of the first driver and the third driver passing freely through openings in the cylindrical central portion of the second driver and in the spherical central portion of the first driver, while the axes of the three drivers are displaced relative to one another at 60° when the shafts are in alignment.

4. In a universal joint for the connection of two shafts the combination of a spherical head on one shaft and a bowl-shaped ball socket member on the other shaft, the said head being provided in its interior with a ball-shaped socket bearing, the head and the ball socket member being provided with slots, an exterior housing ring adapted to encase the said ball socket member, a driving member passing through the slots in the head and the ball socket member, the central portion of the said driving member being of spherical form and adapted to rotate in all directions within the said ball-shaped socket bearing, the ball-shaped socket bearing being formed by a spherical end of a cylindrical recess in the spherical head and by the spherical surface of a thrust bearing ring provided with slots and inserted into the cylindrical recess in said spherical head.

JAKOB SEIB.